United States Patent
Chao

(10) Patent No.: US 6,808,284 B1
(45) Date of Patent: Oct. 26, 2004

(54) EYEGLASSES PROVIDED WITH LIGHT SOURCES, SCREW DRIVERS, AND WRITING INSTRUMENTS

(75) Inventor: David Chao, Los Altos, CA (US)

(73) Assignee: Contour Optik, Inc., Chiayi (CN)

( * ) Notice: Subject to any disclaimer, the term of this patent is extended or adjusted under 35 U.S.C. 154(b) by 0 days.

(21) Appl. No.: 09/931,221

(22) Filed: Aug. 16, 2001

(51) Int. Cl.[7] .............................................. F21V 21/084
(52) U.S. Cl. ...................................... 362/105; 362/253
(58) Field of Search ................................. 362/105, 103, 362/253; 351/111, 116, 119, 41, 158

(56) References Cited

U.S. PATENT DOCUMENTS

| | | | | |
|---|---|---|---|---|
| 4,234,910 A | * | 11/1980 | Price | 362/105 |
| 5,430,503 A | * | 7/1995 | Colitz, Jr. | 351/116 |
| 6,286,954 B1 | * | 9/2001 | Mechlin | 351/111 |

* cited by examiner

Primary Examiner—Alan Cariaso
Assistant Examiner—Mark Tsidulko
(74) Attorney, Agent, or Firm—Greenberg Traurug, LLP

(57) ABSTRACT

The present invention, in one embodiment to eyeglasses coupled with a light source, a screwdriver, or a writing instrument. The eyeglasses have a front frame portion and arms extending therefrom and a light source, screwdriver, or writing instrument positioned on or in the arm or arms.

13 Claims, 4 Drawing Sheets

EYEGLASSES PROVIDED WITH LIGHT SOURCES, SCREW DRIVERS, AND WRITING INSTRUMENTS

FIELD OF THE INVENTION

The present invention is directed to eyeglasses, particularly eyeglasses having light sources, screwdrivers, and writing instruments associated therewith.

BACKGROUND OF THE INVENTION

Conventional eyeglasses are provided with arms that extend from a front frame portion where the lenses are located. The arms extend over the ears of the wearer, while the front frame portion rests on the bridge of the user's nose.

Light sources, such as those operated by a portable light source such as a battery, come in varying sizes and shapes.

Writing instruments such as pens, pencils, highlighters, magic markers, to list but a few on a non-exhaustive list, come in varying shapes and sizes.

SUMMARY OF THE INVENTION

The present invention, in one embodiment to eyeglasses coupled with a light source, screwdriver, or a writing instrument. The eyeglasses have a front frame portion and arms extending therefrom and a light source screwdriver, or writing instrument positioned on the arms, such as at an end of the arm. In a further embodiment, the light source, screwdrivers or writing instrument is positioned within the arm. For instance, the light source or screwdriver may be positioned in a compartment located on the arm.

DETAILED DESCRIPTION OF THE PREFERRED EMBODIMENT

Figure 1:
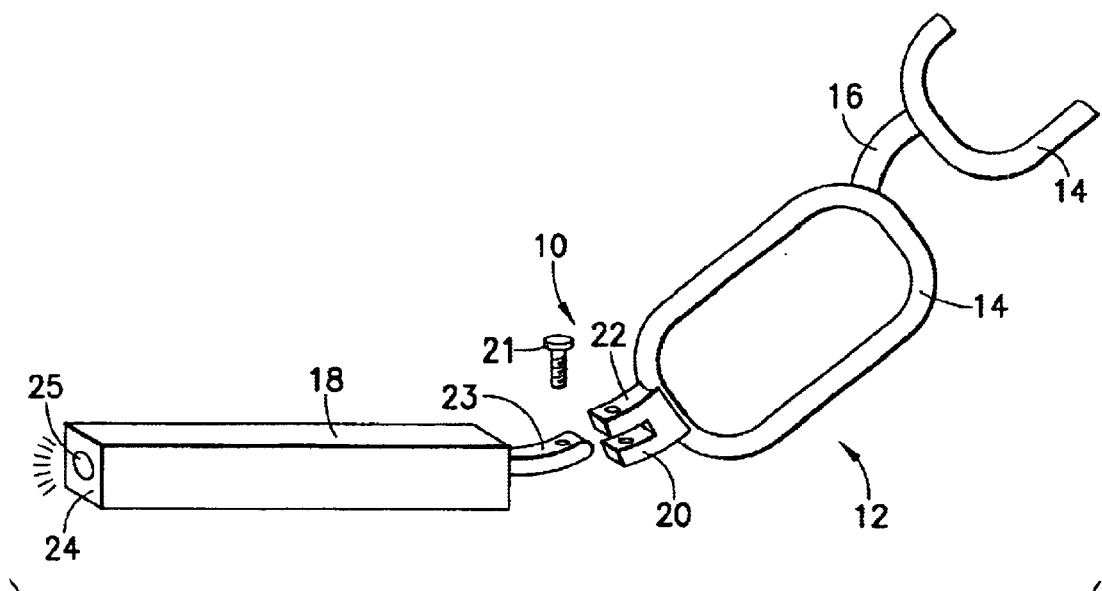
FIG. 1 is a perspective view of an embodiment of the present invention in an unassembled state.

Eyeglasses 10 are shown in an open, ready to wear state in FIG. 1. The glasses have a front frame portion 12 having lens retaining members 14 joined by bridge 16. At the outer ends of the front frame portion, arms 18 (only one of which is shown) are attached thereto at hinges 20. The arms may be joined to the hinges by any known means, such as by screw 21 that joins together a pronged hinge portion 22 and an extension 23 that extends from the arm 18. The pronged portions and the extension are each provided with an opening for receiving the screw, which joins the pronged portion to the extension.

For purposes of this disclosure, the arm includes the temple tip portion. That is, the portion of the temple piece or arm that sheathes the end of the arm that extends over the ears. The temple tip portion may extend to the midportion of the arm and beyond, that is it may approach the hinge. The temple tip provides a location in which various items can be stored. The temple tip can be made of plastic, metal, rubbers, and other materials.

Figure 1A:
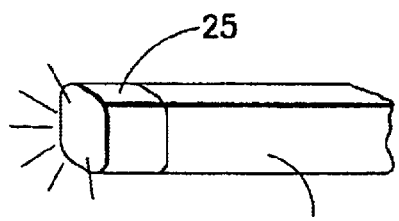
FIG. 1A is an alternative embodiment of the present invention.
Figure 3:
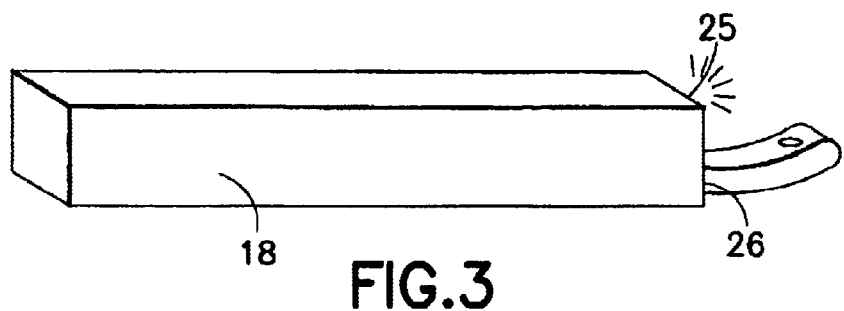
FIG. 3 is a perspective view of an embodiment of the present invention.

The distal end 24 of the arm 18 is provided with a light source 25, which could be a penlight, a laser pointer, or a light emitting diode. A switch, such as a pressure-activated switch or a slidable switch is provided on of the sides of the arms. In FIGS. 1 and 3, the light source unit, including the power source, is positioned within the arm. In FIG. 1A, the light source, such as small power-source containing unit, such as a flashlight, is affixed to the distal end 24 end of the arm 18. The light sources can be activated by any of the conventional activation means known in the art. A non-exhaustive list include pressure activated switches, sliding switches, and rotational switches wherein a component of the light source is rotated to activate (or deactivate) the power supply to the source.

Figure 2:
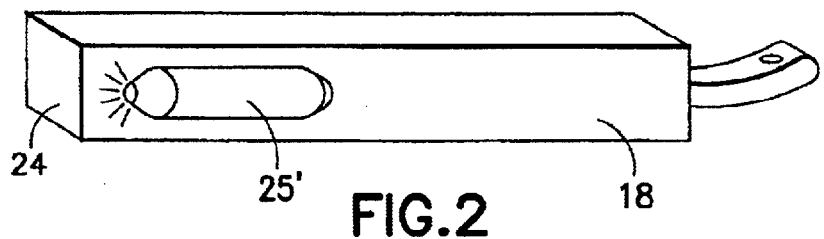
FIG. 2 is a perspective view of an embodiment of the present invention.
Figure 2A:
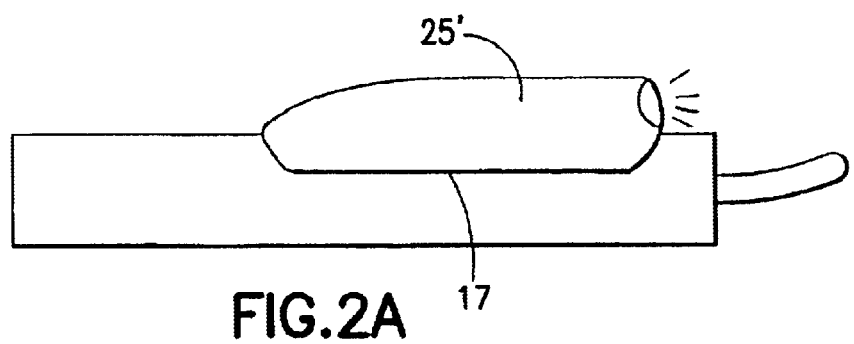
FIG. 2A is a top plan view of the arm shown in FIG. 2.
Figure 4:
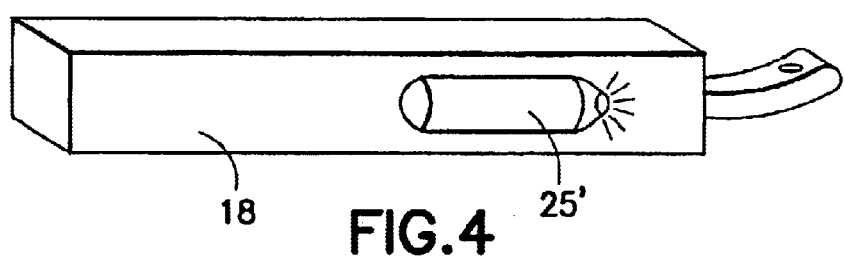
FIG. 4 is a perspective view of an embodiment of the present invention.

In an alternative embodiment, the light source 25' is positioned on a side of the arm 18 in a recess 17. See FIG. 2A. As shown in FIG. 2, the light source is positioned near the middle of the arm. Light source is facing backward, away from the front face of the lens. It should be understood that the direction is a matter of choice and the light source could face the front face of the lens (FIG. 4), or it could face up or down. The light source is secured to the arm by any known securing means, such as by screws or bolts or adhesives.

Yet a further alternative embodiment is shown in FIG. 3. Here, the light source 25 is positioned at the proximal end 26 of the arm 18 and faces forward, towards the front face of the lens.

Figure 5:
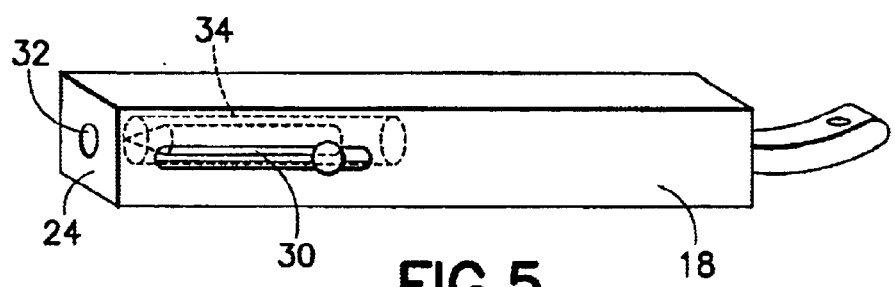
FIG. 5 is a perspective view of an embodiment of the present invention.

In yet a further embodiment of the present invention, an end of the arm is provided with an opening into a cavity in the arm, the cavity being shaped to receive an object. As shown in FIG. 5, the cavity runs in the length direction of the arm and is shaped to receive a pen. The pen 30 is removable from and insertable into cavity 34 via the opening 32 in the arm 18. As shown, the opening is provided in the distal end 24, although the opening could be located elsewhere, such as on the proximal end.

Figure 5A:
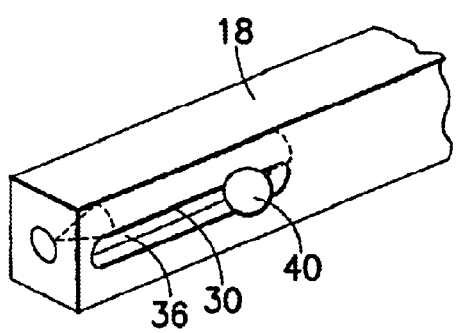
FIGS. 5A–5C, are, respectively, perspective, end plan, and perspective views of the FIG. 5 embodiment of the present invention.
Figure 5B:
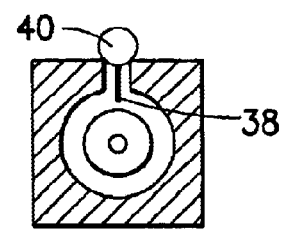
Figure 5C:
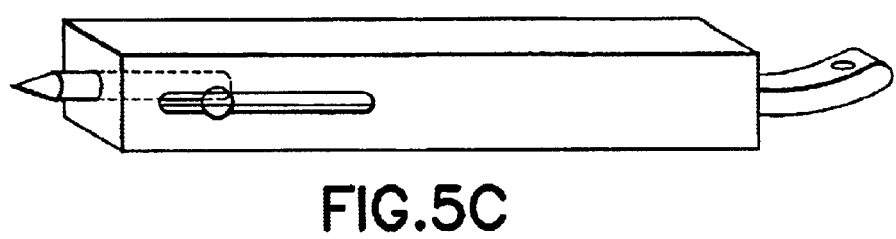

FIGS. 5A and 5B show a embodiment including features in addition to the FIG. 5 embodiment. Arm 18 is provided with a groove extending from the end where the opening is located to a point somewhere on the side of the arm. The groove is dimensioned to receive a neck portion 38 attached at one end to the pen 30 and to a bead 40 at the other end. This facilitates the removal and insertion of the pen, simply by sliding the bead in the desired direction. For example, FIG. 5C shows the pen being moved out of the cavity.

Figure 6:
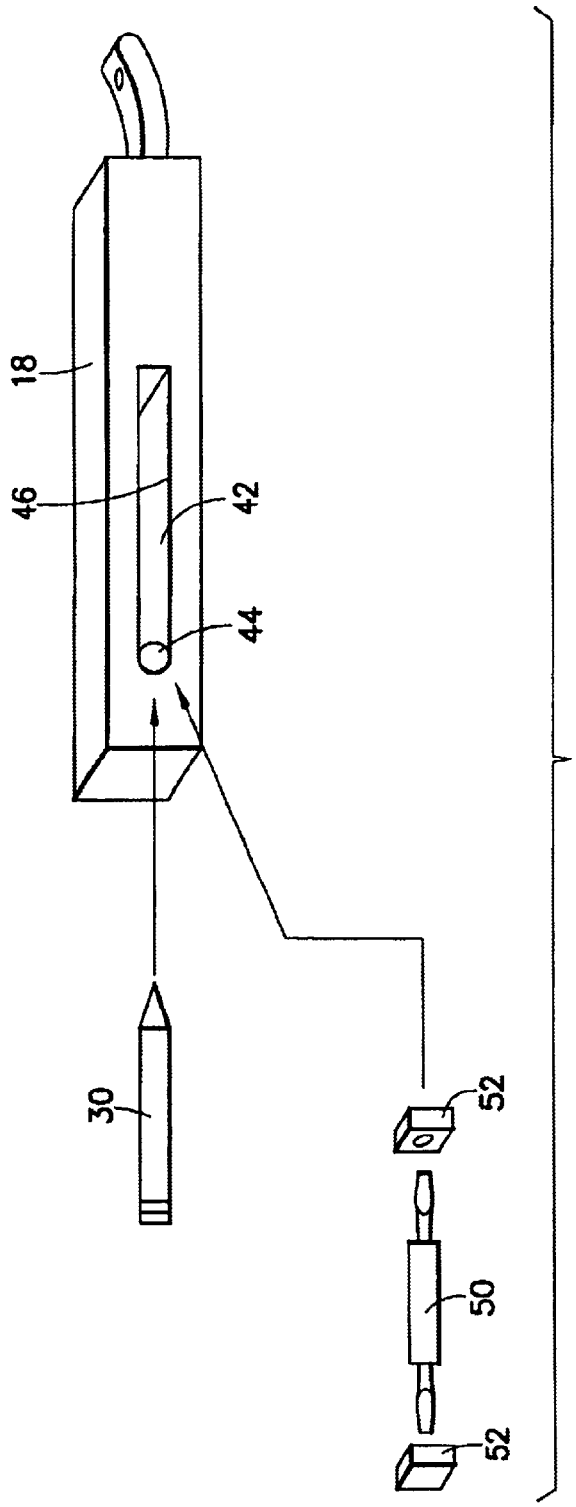
FIG. 6 is a perspective view of an embodiment of the present invention.
Figure 7:
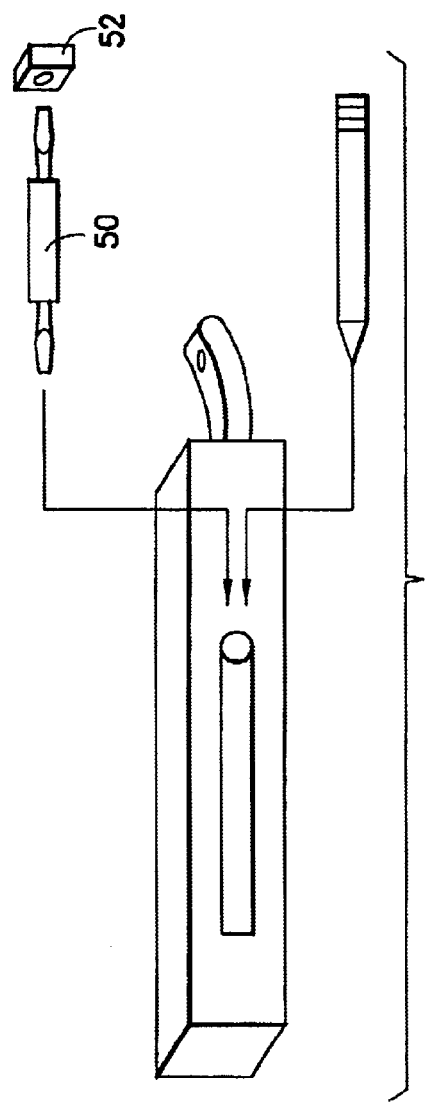
FIG. 7 is a perspective view of an embodiment of the present invention.

FIGS. 6 and 7 show an alternative embodiment for maintaining a pen with the arm of an eyeglass pair. Here, a pouch is provided on one of the sides of the arm . The pouch 42 is provided with an opening 44 into a pocket 46 into which the pen or a screw driver 50 can be stored, or out of which the pen can be removed. FIG. 6 shows the opening facing rearward. FIG. 7 shows the opening facing forward. The screw driver can be provided with drivers on both ends, such as a flat heads or screw heads. Optionally, a cap 52 may be provided over the second end or both of the screw driver.

Figure 8:
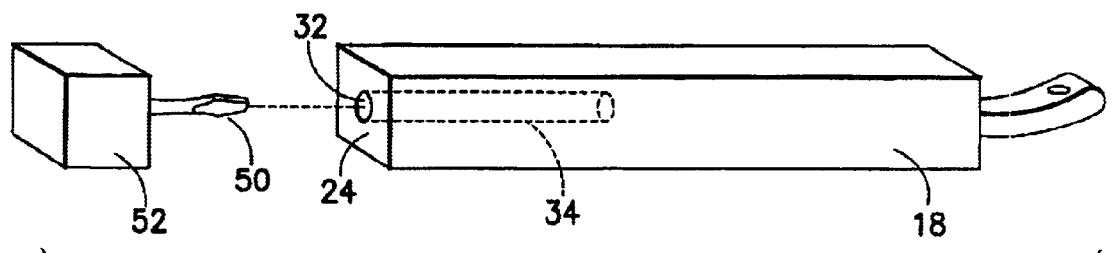
FIG. 8 is an exploded view of an embodiment of the present invention.
Figure 9:
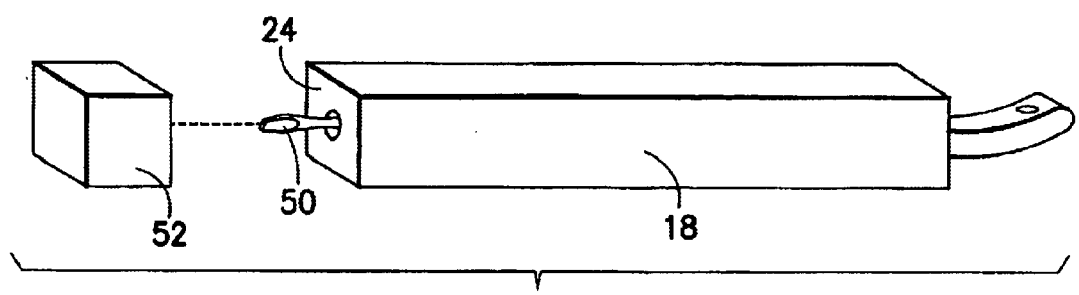
FIG. 9 is an exploded view of an embodiment of the present invention.

FIGS. 8 and 9 show yet another embodiment of the present invention. Here, a screw driver is associated with the arm. As shown in FIG. 8, the distal end 24 of the arm 18 is provided with an opening 32 into a cavity 34 in the arm, the cavity being shaped to receive an object, which in this case is screw driver 50 that is affixed to plug end 52 As shown in FIG. 5, the cavity runs in the length direction of the arm and is shaped to receive the screw driver. The screw driver 50 is removable from and insertable into cavity 34 via the opening 32 in the arm 18. As shown, the opening is provided in the distal end 24, although the opening could be located elsewhere, such as on the proximal end.

In the FIG. 9 embodiment, the screw driver 50 is mounted on the distal end of the arm. The plug end has an open side which fits over the screw driver.

Figure 10:
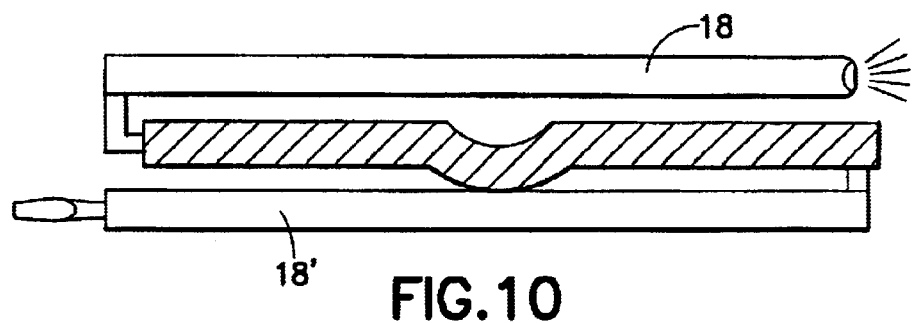
FIGS. 10 and 11 show a perspective view of another embodiment of the present invention.

FIG. 10 shows a further embodiment of the present invention in which a pair of folding eyeglasses in a sandwich configuration, where on one arm 18 a pen is provided as previously disclosed. On the other arm 18', a light source is provided, as previously disclosed.

Various arrangements for making folding eyeglasses are set forth in the applicant's copending U.S. patent application filed under express mail label no. EL 902246505 U.S. on Aug. 16, 2001. Further, it should be understood that one or both of the arms can be provided with any of the components previously described, and other components that would be apparent to the skilled artisan.

Figure 11:
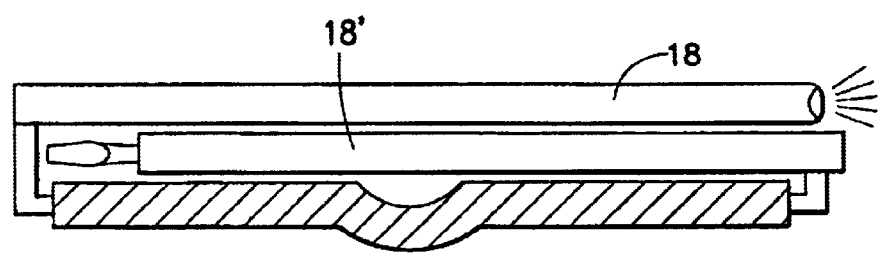

FIG. 11 shows a pair of glasses where the arms fold in the conventional manner, that is, where the glasses fold across the back side of the lenses. This arrangement can also be provided with any of the components previously described, among others that will be apparent to the skilled artisan. Here, the arms are shown with a light source on arm 18 and a screw driver on arm 18'.

What is claimed is:

1. An untethered combination of a pair of eyeglasses and a light source, comprised of:

eyeglasses having a front frame portion and arms extending therefrom; and a light source positioned on one of the arms;

wherein the light source is positioned in a recess of the arm.

2. The combination of claim 1, wherein the recess is positioned at a distal end of the arm.

3. An untethered combination of a pair of eyeglasses and a light source, comprised of:

eyeglasses having a front frame portion and arms extending therefrom; and a light source positioned on one of the arms;

wherein the light source is positioned in a cavity within the arm; and wherein the light source is positioned to shine towards the distal end of the arm.

4. The combination of claim 3, wherein the cavity is positioned at a distal end of the arm.

5. An untethered combination of a pair of eyeglasses and a light source, comprised of:

eyeglasses having a front frame portion and arms extending therefrom; and a light source positioned on one of the arms;

wherein the light source is positioned to shine towards the distal end of the arm.

6. In combination, a pair of eyeglasses and a discrete writing instrument, comprised of:

eyeglasses having a front frame portion and arms extending therefrom; and a discrete writing instrument stored on one of the arms;

wherein one of the arms is provided with an opening into a cavity in the arm, the cavity being shaped to receive a writing instrument, wherein the writing instrument is stored; and wherein a side of the arm is provided with a groove that opens into the cavity, wherein the writing instrument is further comprised of a neck attached at a first neck end to the writing instrument and at a second neck end to a bead, wherein the neck is dimensioned to reside within the groove when the writing instrument is positioned within the groove, and the bead is situated outside of the groove.

7. An untethered combination of a pair of eyeglasses and a light source, comprised of:

eyeglasses having a front frame portion and arms extending therefrom; and a light source positioned on one of the arms;

wherein the light source is positioned to shine towards the proximal end of the arm; and wherein one of the arms is provided with a container on one of its sides for storing a writing instrument.

8. The combination of claim 7 wherein the container is provided with an opening that faces towards a distal end.

9. The combination of claim 7, wherein the container is provided with an opening that faces towards the proximal end.

10. In combination, a pair of eyeglasses and a discrete screw driver, comprised of:

eyeglasses having a front frame portion and arms extending therefrom; and a discrete screw driver stored on one of the arms;

wherein one of the arms is provided with an opening into a cavity in the arm, the cavity being shaped to receive a screwdriver, wherein the screwdriver is stored; and wherein a side of the arm is provided with a groove that opens into the cavity, wherein the screwdriver is further comprised of a neck attached at a first neck end to the screwdriver and at a second neck end to a bead, wherein the neck is dimensioned to reside within the groove when the screwdriver is positioned within the groove, and the bead is situated outside of the groove.

11. An untethered combination of a pair of eyeglasses and a light source, comprised of:

eyeglasses having a front frame portion and arms extending therefrom; and a light source positioned on one of the arms;

wherein the light source is positioned to shine towards the proximal end of the arm; and wherein one of the arms is provided with a container on one of its sides for storing a screwdriver.

12. The combination of claim 11 wherein the container is provided with an opening that faces towards a distal end.

13. The combination of claim 11 wherein the container is provided with an opening that faces towards the proximal end.

* * * * *